United States Patent
Glebov et al.

(10) Patent No.: US 7,209,621 B2
(45) Date of Patent: Apr. 24, 2007

(54) OPTICAL APPARATUSES PROVIDING OPTICAL INTERCONNECTIONS AMONG A PLURALITY OF ELECTRONIC COMPONENTS

(75) Inventors: Alexei Glebov, San Mateo, CA (US); Michael G. Lee, San Jose, CA (US); Kishio Yokouchi, Kanagawa (JP)

(73) Assignee: Fujitsu Ltd., Kawasaki (JP)

( * ) Notice: Subject to any disclaimer, the term of this patent is extended or adjusted under 35 U.S.C. 154(b) by 240 days.

(21) Appl. No.: 10/888,308

(22) Filed: Jul. 9, 2004

(65) Prior Publication Data
US 2006/0008199 A1 Jan. 12, 2006

(51) Int. Cl.
*G02B 6/10* (2006.01)

(52) U.S. Cl. ............... 385/129; 385/130; 385/131; 385/132

(58) Field of Classification Search ............... 385/129
See application file for complete search history.

(56) References Cited

U.S. PATENT DOCUMENTS

| | | |
|---|---|---|
| 6,343,171 B1 | 1/2002 | Yoshimura et al. |
| 6,400,855 B1 | 6/2002 | Li et al. |
| 6,504,966 B2 | 1/2003 | Kato et al. |
| 6,603,915 B2 | 8/2003 | Glebov et al. |
| 6,611,635 B1 | 8/2003 | Yoshimura et al. |
| 6,690,845 B1 | 2/2004 | Yoshimura et al. |
| 6,823,097 B2 | 11/2004 | Glebov et al. |
| 6,828,606 B2 | 12/2004 | Glebov |
| 2002/0114556 A1 | 8/2002 | Kato et al. |
| 2003/0035614 A1 | 2/2003 | Glebov et al. |

(Continued)

OTHER PUBLICATIONS

L. Dalton, et al., "Polymeric Electro-optic Modulators: From Chromophore Design to Integration with Semiconductor Very Large Scale Integration Electronics and Silica Fiber Optics," Ind. Eng. Chem. Res., Jan. 1999, pp. 8-33, vol. 38, No. 1.

S. Garner, et al., "Three-Dimensional Integrated Optics Using Polymers IEEE Journal of Quantum Electronics," Aug. 1999, pp. 1146-1155, vol. 35, No. 8.

Glebov, et al., "Two-dimensional microlens arrays in silica-on-silicon planar lightwave circuit technology," J. Microlith., Microfab., Microsyst., Oct. 2003, pp. 309-318, vol. 2 No. 4.

*Primary Examiner*—Frank G. Font
*Assistant Examiner*—Mary El-Shammaa
(74) *Attorney, Agent, or Firm*—Sheppard Mullin Richter & Hampton LLP

(57) ABSTRACT

Optical apparatuses providing optical interconnections among a plurality N of electronic components. One exemplary apparatus comprises a slab waveguide having a core layer that enables light beams to propagate in a plurality of directions, a plurality of N reception ports, and a plurality of N transmission ports, each reception port and each transmission port serving a respective electronic component, and each being optically coupled to the core layer of the slab waveguide. Each transmission port is configured to receive a plurality of light beams from its assigned electronic component and to transmit each received light beam onto the slab waveguide in a direction toward a reception port. Each reception port is configured to receive from the slab waveguide a plurality of light beams transmitted to it from at least two different transmission ports. Light beams within the slab waveguide are permitted to cross paths. Other exemplary embodiments are disclosed.

25 Claims, 13 Drawing Sheets

U.S. PATENT DOCUMENTS

| | | |
|---|---|---|
| 2003/0035632 A1 | 2/2003 | Glebov et al. |
| 2003/0059190 A1* | 3/2003 | Gunn et al. ................ 385/130 |
| 2003/0063885 A1* | 4/2003 | Gunn et al. ................ 385/131 |
| 2003/0068151 A1* | 4/2003 | Gunn et al. ................ 385/129 |
| 2003/0103712 A1 | 6/2003 | Glebov et al. |
| 2003/0202732 A1 | 10/2003 | Glebov et al. |
| 2003/0206675 A1 | 11/2003 | Glebov et al. |
| 2004/0028316 A1 | 2/2004 | Yokouchi |
| 2004/0126056 A1 | 7/2004 | Aoki et al. |
| 2004/0126079 A1 | 7/2004 | Aoki et al. |
| 2004/0206988 A1 | 10/2004 | Glebov |
| 2005/0002634 A1 | 1/2005 | Glebov et al. |

* cited by examiner

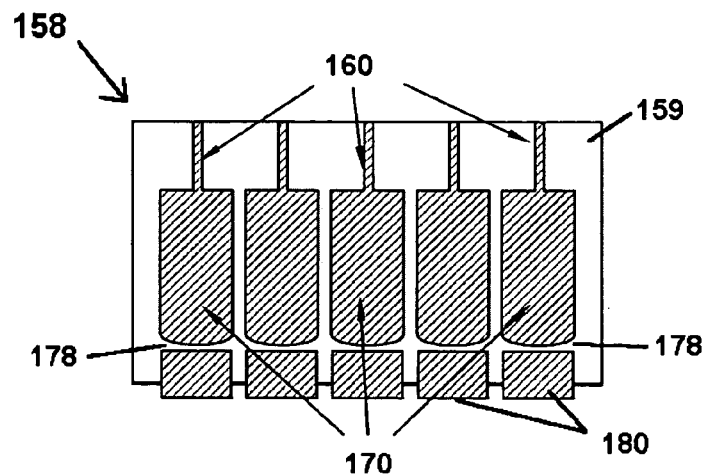
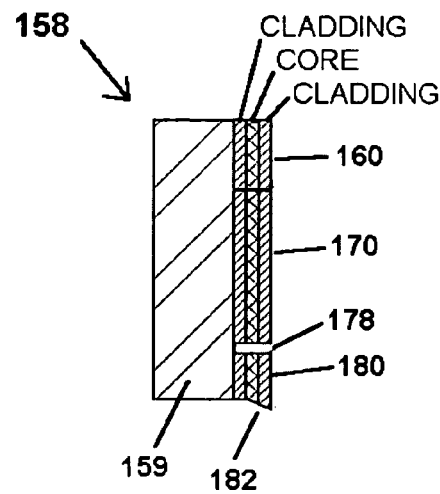
FIG. 3  FIG. 4
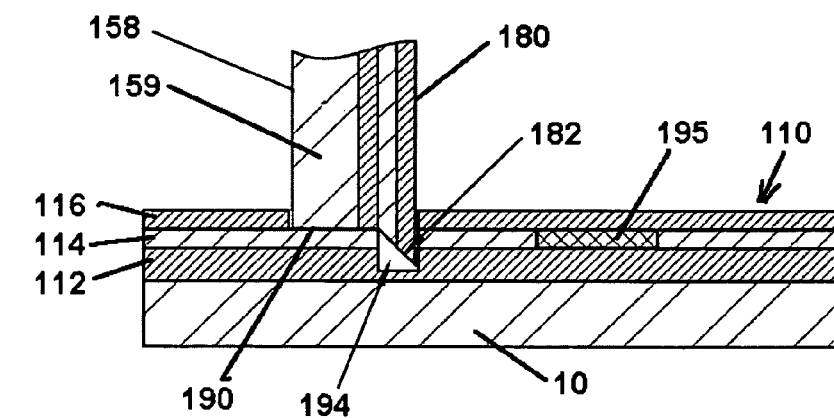
FIG. 5

Coupling microlens array

OPTICAL APPARATUSES PROVIDING OPTICAL INTERCONNECTIONS AMONG A PLURALITY OF ELECTRONIC COMPONENTS

FIELD OF THE INVENTION

The present invention relates to providing optical interconnects among a plurality of electronic components, such as computer daughter boards, blade servers, computers and servers, networks, and the like, such that optical communications may occur between each electronic component and all of the other electronic components without having to route optical signals through a central host.

BACKGROUND OF THE INVENTION

Today, there are many applications requiring broadband communications among various entities, which we broadly call "electronic components" herein. Examples of such electronic components are: the "daughter boards" of a mainframe computer or a super computer, the blade servers of a mainframe server, the computers and servers of a network computing system, the printers and other resources of network computing system, and so on.

Each of these systems is reaching bandwidth limitations arising from the use of electrical wiring for their interconnections. As an example, we look at mainframe and supercomputers, which comprise hundreds to thousands of integrated circuit chips held and interconnected by "daughter boards," each with tens to hundreds of IC chips per daughter board. In these systems, there is a need to convey electrical signals between IC chips located on different daughter boards. This is commonly accomplished by providing an electrical backplane, which comprises hundreds, and sometimes thousands, of electrical traces formed within a board, and a plurality of slot holders for the daughter boards. Each slot holder has electrical contacts that make electrical connections to corresponding electrical contacts disposed at the holding edge of its daughter board. The electrical contacts are in turn coupled to the electrical traces in the backplane, and in combination therewith, provide electrical interconnections between the daughter boards. Also, some of the electrical contacts provide power supply voltages to the daughter boards. Each slot holder typically allows its daughter board to be selectively removed for testing, repair, and/or replacement.

With the clock frequencies of computer systems now well into the Gigahertz range, there is an increasing need for signals between chips to move at the speed of light. However, the propagation speed of electrical signals through the electrical traces of the backplane is relatively slow compared to the speed of light.

There have been many approaches of using optical means to convey signals between daughter boards. One approach has been to use daughter boards with channel waveguides, and back planes with channel waveguides, with optical connectors between the channel waveguides of the boards and back planes. However, this system suffers from degradation in the optical quality of the optical signals as they travel from one daughter board to the back plane, and then to another daughter board. Another approach has been to transmit optical signals between adjacent daughter boards through the free space between them. However, the daughter boards must be precisely aligned with one another, which is time-consuming and requires expensive precision components. Despite these efforts, the optical signals in this system also degrade significantly in traveling between daughter boards. Still other approaches have addressed these problems by using extremely compact stacks of alternating layers of IC chips and optical waveguides, each layer being very thin. However, in these approaches, the steps of testing and replacing the layers of IC chips are difficult.

As another example of a system reaching its bandwidth limit, we look at the common network computing system, where file servers, printer resources, and banks of computers are electrically connected to a central host. Here, communications from one electronic component (e.g., a computer) and another (e.g., a file server or a printer) are routed through the central host. As the number of entities on the network grows, a communication bottleneck in the central host is reached in these systems. In addition, the electrical cables used to interconnect these devices limit the bandwidth as the cable distance increases, thereby placing limits on the geographical size of such networks and reducing communication bandwidth.

SUMMARY OF THE INVENTION

In making their invention, the inventors have recognized that the channel waveguides of prior art optical back planes have high propagation losses on the order of 0.1 to 0.5 dB/cm, which makes the transmission of optical signals over distances of 30 to 100 cm very difficult. In addition, such optical backplanes often have 45° tilted mirrors (optical couplers) that direct the optical signals from the channel waveguides of the daughter boards into and out of the channel waveguides that run parallel to the top surface of the back plane, and each of these tilt mirrors can cause a loss of 1 dB to 3 dB in the intensity of the optical signal. Thus, for interconnect distances of 30 cm and more, total link losses may become much more than 10 dB. The present invention addresses this problem and other problems by dispensing with the channel waveguide optical back plane.

Broadly stated, the present invention encompasses optical apparatuses providing optical interconnections among a plurality N of electronic components, N being at least three, and preferably at least four. An exemplary optical apparatus according to the present invention comprises a slab waveguide having a core layer that enables light beams to propagate in a plurality of directions within the core layer, and a plurality of N reception ports, each of which is assigned to serve a respective electronic component, and each of which is optically coupled to the core layer of the slab waveguide. The exemplary optical apparatus further comprises a plurality of N transmission ports, each transmission port being associated with a respective reception port and assigned to serve the same electronic component as its associated reception port. Each transmission port is configured to receive a plurality of light beams (i.e., optical signals) from its assigned electronic component and to transmit each received light beam onto the slab waveguide along an optical path to a reception port. The transmission ports provide a plurality of these optical paths within the slab waveguide, with at least two of these optical paths crossing one another. In turn, each reception port is configured to receive from the slab waveguide a plurality of light beams transmitted to it from at least two different transmission ports, and preferably from N−1 transmission ports (preferably excluding the one to which it is associated). Light beams within the slab waveguide are permitted to cross one another's paths, and do not substantially interfere with one another when they do so. In addition, the slab waveguide only provides one dimension of optical confinement for a light beam, instead of the two-dimensions of optical confinement provided by channel waveguides.

Through their work, the inventors have found that slab waveguides have lower optical losses than channel waveguides. This is due to the absence of sidewall surfaces and corresponding sidewall roughness in the slab waveguide. In a channel waveguide, the sidewall roughness causes light to scatter, which in turn results in optical losses. In addition, since the slab waveguide permits light beams to cross one another, a single core layer may be used, thereby lowering manufacturing costs and increasing manufacturing yields. In comparison, channel waveguides are not allowed to cross one another. Because of this, a conventional optical back plane generally has several layers of channel waveguides stacked upon one another to enable optical signals to cross within the back plane. These back planes are expensive to construct, and are prone to manufacturing defects, which reduce their manufacturing yields.

In addition, the conventional optical back plane requires connections of optical signals between its multiple core layers using 45° tilt mirrors, which substantially increase optical losses. In comparison, many embodiments of the present invention enable optical interconnections without the use of 45° tilt mirrors.

In addition, the slab waveguide may be constructed with inexpensive methods, and the transmission ports and reception ports may be constructed with wafer-scale production techniques, which provide for precision components, mass produced at a reduced cost.

Accordingly, it is an object of the present invention to reduce the optical losses associated with conveying optical signals in a back plane, and the like.

It is a further object of the present invention to improve the strength and signal quality of optical signals propagated through optical back planes, and the like.

It is an object of the present invention to reduce the costs of manufacturing optical back planes, and the like.

It is an object of the present invention to increase the manufacturing yield of optical back planes, and the like.

It is an object of the present invention to provide for mult-point communications among several electronic components without having to route optical signals through a central server.

These and other objects of the present invention will become apparent to one of ordinary skill in the art in view of the figures, the present specification, and the appended claims.

BRIEF DESCRIPTION OF THE DRAWINGS

FIG. 3 is a top plan view of a first exemplary planar microlens module according to the present invention.

FIG. 4 is a side view of the first exemplary planar microlens module of FIG. 3 according to the present invention.

FIG. 5 is a cross-sectional of the first exemplary planar microlens module interfaced with the slab waveguide according to the present invention.

DETAILED DESCRIPTION OF THE INVENTION

Figure 1:
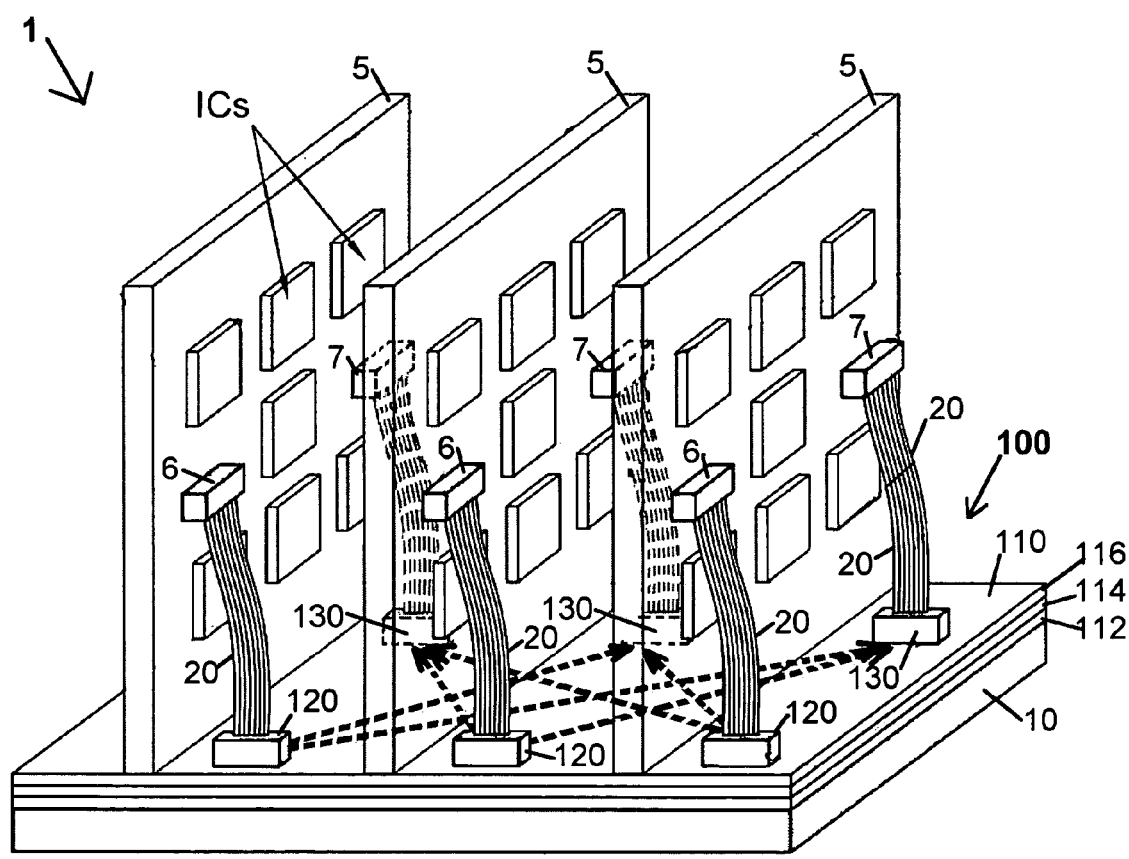
FIG. 1 shows a first embodiment of the optical apparatus according to the present invention.

FIG. 1 shows a first embodiment of the optical apparatus 100 according to the present invention, where the optical apparatus is used to provide optical interconnections among a plurality of N daughter boards 5 in a computer system 1. In this example, daughter boards 5 are the electronic components for which apparatus 100 provides optical interconnections. Apparatus 100 comprises a slab waveguide 110, a plurality of N transmission ports 120 optically coupled to slab waveguide 110, and a plurality of N reception ports 130 optically coupled to the slab waveguide. Slab waveguide 110 may be formed on a substrate 10, which may be part of main backplane for the computer system 1. In such a case, power connections and low-frequency signal connections may be provided through substrate 10 to daughter boards 5 (in a manner than does not interfere with the transmission of optical signals in slab waveguide 110), and substrate 10 and apparatus 100 may collectively serve as an electrical/optical back plane for computer system 1. Slab waveguide 110 comprises a lower cladding layer 112, a core layer 114, and preferably an upper cladding layer 116 (although apparatus 100 may be constructed so that air acts to replace upper cladding layer 116). Layers 112–116 preferably comprise polymer materials, which may be formed over substrate 10 by screen-printing, spray coating, and/or spin coating, depending on the board dimensions. The core layer has a refractive index that is 0.5%–3% larger than the refractive index of the cladding layer(s), preferably 1%–2% larger, and the core and cladding layers have high transparency to the wavelength of the light beams (optical signals) coupled to slab waveguide 110. Substrate 10 may comprise any conventional board material used in the industry, such as FR4 board.

Daughter boards 5 may comprise printed circuit boards, or other board configurations known to the art, and may comprise any conventional board material used in the industry. Each daughter board 5 has a plurality of integrated circuit chips (ICs) disposed on the front surface of the board, and a network of electrical traces that provide electrical interconnection among the IC chips. In addition, each daughter board 5 comprises at least one bank of optical-signal transmitters 6 disposed in or on a surface of the board, and a bank of optical-signal receivers 7 disposed in or on a surface of the board. A transmitter 6 may comprise any conventional light emitting device, with edge-emitting lasers and vertical-cavity surface-emitting laser devices (VCSELs) currently being preferred. Light emitting diodes may also be used. A receiver 7 may comprise any conventional photonic-receiving devices, with photodiodes (PDs) currently being preferred. Using its transmitters 6, each daughter board generates optical signals (light beams) for communication to the other daughter boards. (Generally, these optical signals are generated from electrical signals that the daughter board wants to send to other daughter boards.)

As a broad overview, the optical signals (light beams) generated by the transmitters 6 of a daughter board are routed from the board to a respective transmission port 120 by way of a set of optic fibers, which are preferably manufactured together as a fiber array 20. Each light beam within the set has a destination daughter board. The transmission port 120 receives these light beams, and couples each onto slab waveguide 110 so as to propagate along a respective optical path to a reception pod 130 for the destination daughter board (i.e., a reception pod 130 that is assigned to receive light beams for the destination daughter board). The propagation of light beams within the slab waveguide 110 is illustrated by the wide dashed lines in FIG. 1. Each reception pod 130 collects the light beams (optical signals) directed to it, and conveys the collected light beams to another fiber array 20, which in turn conveys the collected light beams to the destination daughter board. Within pods 120 and 130, and within slab waveguide 110, each light beam typically has a rectangular cross-section (that is to say, the cross section need not be circular or oval-like). As is known in the optics art, the cross-section of a light beam may have any shape, and is not restricted to a circular cross-section. The optical cores in a fiber array 20 are preferably made of low-loss material, and may have circular cross-sections to further reduce optical losses. Fiber arrays 20 with MT connectors and ferrules are commercially available with channel counts (i.e., number of fiber cores) up to several hundred. The pitch spacing of the fiber cores can be quite small, on the order of 50 µm to 100 µm. As part of forming a transmitter 6, an array of VCSEL devices can be readily formed on a semiconductor substrate to match this pitch spacing. Likewise, as part of forming a receiver 7, an array of photodiode devices can be readily formed on a semiconductor substrate to match this pitch spacing.

As shown in FIG. 1, daughter boards 5 are disposed over slab waveguide 110 and substrate 10, with an edge of each board facing the top surface of slab waveguide 110. The edges of daughter boards 5 may abut the top surface of slab waveguide 110, with the top surface of the daughter board at a 90-degree angle to the top of slab waveguide 110, as shown in FIG. 1, or they may be positioned at an angle thereto (for example, any angle in the range of 10° to 170°). Slot holders (not shown) may be affixed to substrate 10, with each slot holder configured to accept an edge of a daughter board 5 and to hold the board firmly in place. Each slot holder preferably enables the daughter board 5 to be selectively removed for testing, repair, and/or replacement. As an option, the slot holder may be further configured to have electrical connectors that make electrical contact with corresponding electrical connectors disposed at the edge of the daughter board. Such electrical connectors may provide power supply voltages and electrical signals. As another approach, a holding frame (not shown) may be used to hold each of the daughter boards 5, substrate 10, and slab waveguide 110 in position in relation to one another. The frame may have front and side slot holders for each daughter board. The slot holders preferably allow the daughter boards to be removed for testing, repair, and/or replacement.

Figure 2:
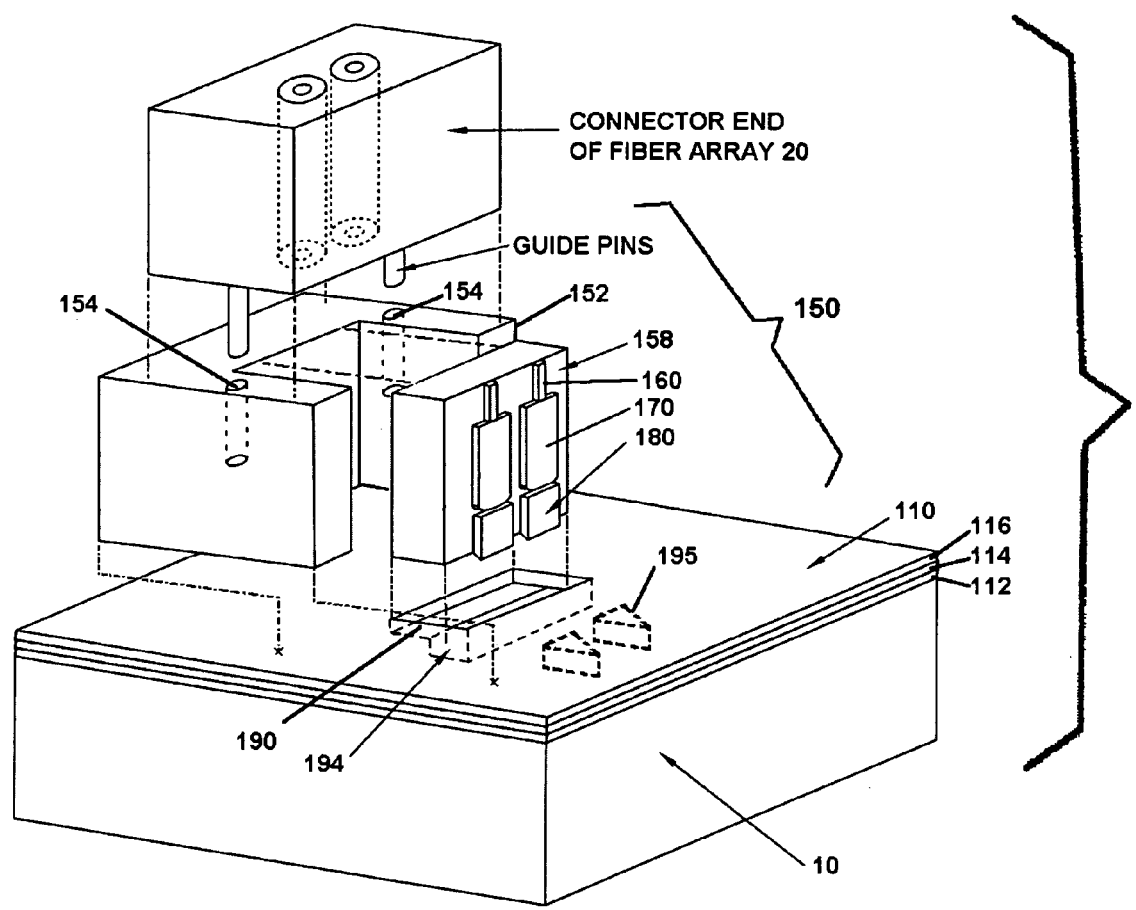
FIG. 2 is an exploded perspective view of a first embodiment of a port according to the present invention, that may be used for each of the transmission port and reception port according to the present invention.

FIG. 2 shows an exploded view of an exemplary port 150 according to the present invention. Each transmission port 120 may comprise an instance of port 150, and each reception port 130 may comprise an instance of port 150. Port 150 comprises an adapter 152 attached to slab waveguide 110 by solder or adhesive, and preferably anchored to substrate 10 by fasteners (not shown). Adapter 152 interlocks with a connector end of a fiber array 20 from a daughter board 5. If the connector of the fiber array 20 comprises an MT connector with fiber ferrule and guide pins, the adapter may have receiving apertures 154 to accept the guide pins. In addition, adapter 152 may have a detent locking mechanism (not shown) that engages a recess in the MT connector of fiber array 20 in order to hold the MT connector in a fixed position relative to adapter 152. The connectors of fiber array 20 and adapter 152 can be constructed such that the connector ends can be readily detached and re-attached to adapter 152. In a similar manner, transmitters 6 and receivers 7 can be constructed so that the connector ends of fiber array can be readily detached and re-attached to transmitters 6 and receivers 7.

Placed within adapter 152 is a planar microlens module 158 having a back surface that abuts adapter 152 and is preferably adhered thereto with adhesive, and a front surface opposite to the back surface. Micro lens module 158 also has a top edge that faces the connector end of fiber array 20, a bottom edge that is opposite to the top edge, and two side edges that abut inner surfaces of adapter 152 and that may be adhered thereto with adhesive. The bottom edge is disposed so as to face slab waveguide 110, and it may either directly contact slab waveguide 110, or be disposed within a recess 190 of slab waveguide (as described below in greater detail). A plurality of waveguides 160, a plurality of planar micro lenses 170, and a plurality of reflectors 180 are formed on the front surface of microlens module 158. A waveguide 160, a planar lens 170, and a reflector 180 are grouped together and disposed in relation to one another so as to couple a light beam between a fiber of fiber array 20 and the core layer of slab waveguide 110. Specifically, each waveguide 160 has a first end that is positioned to receive a light beam from a corresponding fiber core of fiber array 20, and a second end coupled to one side of respective micro lens 170. The respective micro lens 170 spreads the beam width of the light beam, and provides a wide collimated beam to a respective reflector 180. The respective reflector 180 receives this beam, and reflects it at an angle (e.g., 90°)

into the core layer of slab waveguide 110. To assist with this, a recess 194 is provided in slab waveguide 110. Recess 194 is dimensioned to accept reflector 180, and has a depth that extends down to the bottom of core layer 114, or more.

The light through elements 160, 170, and 180 may also propagate in the reverse direction without degradation or substantive changes to the waveguide, planar lens, or reflector. In this case, a light beam is received by reflector 180, which reflects the beam at an angle and directs it to the planar micro lens 170, which in turn converges the beam to a smaller width and directs it into waveguide 160, which in turn couples it to a fiber of fiber array 20. Thus, port 150 may also be used for a reception port 130.

Once the light has been coupled to the slab waveguide 110 from a reflector 180, it ordinarily propagates straight out from reflector 180. In order to direct the light beam to the appropriate receiving port, a deflecting element 195 is usually disposed within at least core layer 114, and sometimes also within layers 112 and 116, to deflect the beam by a preset angle toward the desired destination receiving port. Deflectors 195 are also usually present at a receiving port, and they bend the light beams directed to the receiving port toward respective reflectors 180. Each deflector 195 can be implemented in a number of ways, such as a mirrored surface disposed vertically within the layers 112–116, a grating, or a prism-shaped piece of material having a refractive index that is different from that of the core layer 114. Of these, the prism-shaped material is easy to form and is currently preferred.

FIG. 3 shows a front view of planar microlens module 158, and FIG. 4 shows a side view thereof. Referring to both figures, each of elements 160, 170, and 180 comprises a wave-guiding layers formed on top of a rigid substrate 159. The wave-guiding layers comprise a bottom cladding layer formed on substrate 159, a core layer formed over the bottom cladding layer, and an upper cladding layer formed over the core layer (see FIG. 4). The wave-guide layers are initially formed as whole layers, and are then pattern-etched to remove material around the outer dimensions of the elements 160, 170, and 180, to define them. Of note, a gap 178 between each planar lens 170 and its corresponding reflector 180 is present, and is usually filled with air or a material having a lower index of refraction than that of the core layer (higher index material may be used, but requires a differently shaped lens). One or both sides of the gap is/are curved to provide the focusing properties of the lens (that is to say that lens gap 178 is part of micro lens 170). The shape can be readily computed by one of ordinary skill in the art given the refractive indices of the core/cladding layers and material (if any) within lens gap 178. The gap enables planar lens 170 to collimate the light. Referring to FIG. 4, which is a side view of microlens module 158, one edge of each reflector 180 is beveled to provide a 45-degree tilt mirror 182 (the angle may be different if substrate 159 of microlens module 158 is not disposed perpendicular to slab waveguide 110). The difference between the refractive indices of the core layer and air (or back-fill material) is large enough to enable most of the light to be reflected at the beveled surface.

Waveguide 160 preferably comprises a multimode channel waveguide with a square or rectangular cross-sections, with side dimensions on the order of 20 μm to 70 μm per side, and a length of 500 μm to 1000 μm. Single mode channel waveguide are also possible, however, the alignment to the fiber cores of fiber array 20 is more difficult. It is also possible to omit waveguide 160 from the microlens array 158, and to directly couple the fiber cores of fiber array 20 to respective micro lenses 170. Typically, micro lens 170 has a length in the range of 500 μm to 2000 μm, and a width in the range of 100 μm to 500 μm. The height of micro lens 170 is typically the same as that of waveguide 160, with a typical core layer thickness in the range of 5 μm to 25 μm. Typically, reflector 180 has a length in the range of 200 μm to 1000 μm, and a width in the range of 100 μm to 500 μm. The height of reflector 180 is typically the same as that of micro lens 170, with a typical core layer thickness in the range of 5 μm to 25 μm. The width of gap 178 typically ranged between 20 μm to 200 μm. Because their core widths are relatively wide, micro lens 170 and reflector 180 effectively act as miniature slab waveguides. Micro lens 170 collimates the beam in to a parallel or slightly cross-collimated beam (the latter is explained in greater detail below). Reflector 180 and deflector 195 typically do not affect the collimated and cross-collimated properties. Such a beam can propagate very long distances without significant divergence. For example, beams with widths of 0.4 mm can propagate up to 10 cm, while beams with widths of 1 mm can propagate more than 50 cm to 100 cm without significant divergence. In typical configurations, waveguide 160 accepts a light beam having a width on the order of 10 μm to 50 μm, and micro lens 170 produces a collimated beam that typically has a width in the range of 50 μm to 1,000 μm (1 mm), as measured at either end of reflector 180. As such, port 150 can typically receive a plurality of light beams of relatively narrow width, and can convert them into an array of collimated beams with widths in the range of 50 μm to 1,000 μm (1 mm). In view of the disclosure of the present application, it is within the ordinary skill in the art to select the dimensions and lens curvature of components 160, 170, and 180 to provide for the above collimated beam properties.

FIG. 5 shows a cross-sectional side view of the micro-lens array 158 in optical contact with slab waveguide 110. The bottom end of substrate 159 fits within recess 190, and the tilt mirror 182 of reflector 180 fits within recess 194. Because tilt mirror 182 has a beveled edge, it does not completely fill recess 194, and the unfilled space may be left open (air), or may be filled with a material having a low refractive index. The dimensions of tilt mirror 182 and gaps 190 and 194 are selected so that light traveling through reflector 180 (from top to bottom) reflects off of the beveled end surface of the core layer of 180, and into core layer 114. Once in core layer 114, the light beam travels toward deflector 195, wherein its propagation direction is changed to follow a path toward the destination reception port 130 for the light beam (optical signal). As shown in FIG. 5, deflector 195 is preferably positioned in front of the tilt mirror 182 of reflector 180. Good alignment of the components enables efficient coupling of the light beams from fiber array 20 to slab waveguide 110. In this regard, adapter 152 serves to align microlens module 158 to slab waveguide 110 (particularly the core layers of reflector 180 to the core layer 114 slab waveguide 110, and to deflectors 195), and further serves to align microlens module 158 to fiber array 20 (particularly the cores of waveguides 160 to the cores of the fiber array).

Figure 6:
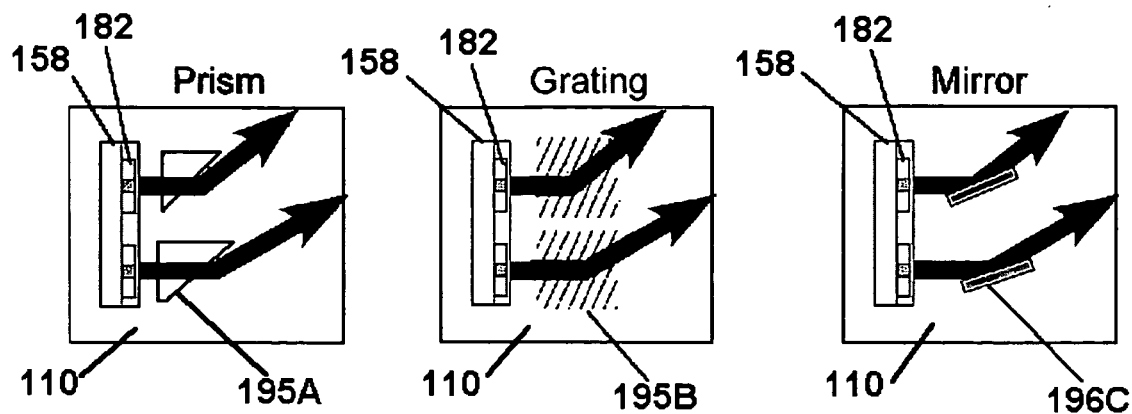
FIG. 6A–6C schematically illustrate three exemplary embodiments of deflectors according to the present invention.

As indicated above, deflector 195 may be implemented in a variety of ways. FIGS. 6A–6C, which are isolated top-plan schematic views of microlens module 158 joined to slab waveguide 110, show three exemplary ways. FIG. 6A shows an exemplary deflector 195A that comprises a prism-shaped piece of material that is disposed within core layer 114 of slab waveguide 110, with the material having a higher index of refraction than that of the core. It is also possible to fill the voids with material having a lower refractive index, particularly if the refractive index is greater than that of the cladding layers. (In this case, the shape of the void will be different.) The prism may be readily formed by removing shaped pieces of material from core layer 114 (e.g., triangles, trapezoids, polygons) by conventional etching techniques before upper cladding layer 116 is formed. Then, the shaped voids may be filled in with a high refractive-index material (higher than that of layer 114). This filling step is usually done by a blanket coating of the material over the substrate, which leaves an excess layer of high refractive-index material over core layer 114. The excess layer may be removed by conventional polishing techniques, which planarize the top surface of the core layer and the filled voids. Also, the excess layer may be removed by a photolithographic step that masks the filled voids, followed by an etching step that removes the excess layer. After this, upper cladding layer 116 may be formed.

FIG. 6B shows an exemplary deflector 195B that comprises a grating structure. The grating structure comprises alternating material layers of different refractive index, which act to deflect the light. The alternating materials may comprise the materials of the core and upper cladding layers, or two different core materials (each having a refractive index greater than the cladding layer). Finally, FIG. 6C shows an exemplary deflector 195C that comprises a mirror. The mirror may be formed by etching a trench through layers 112–116, and filling the trench with a metal. If only a small amount of deflection is needed, then the trench may be left unfilled, or filled with material having a low refractive index (lower than that of core layer 114, and typically lower than that of cladding layers 112 and 116). The change in refractive index is sufficient to deflect light at a shallow angle.

Figure 7:
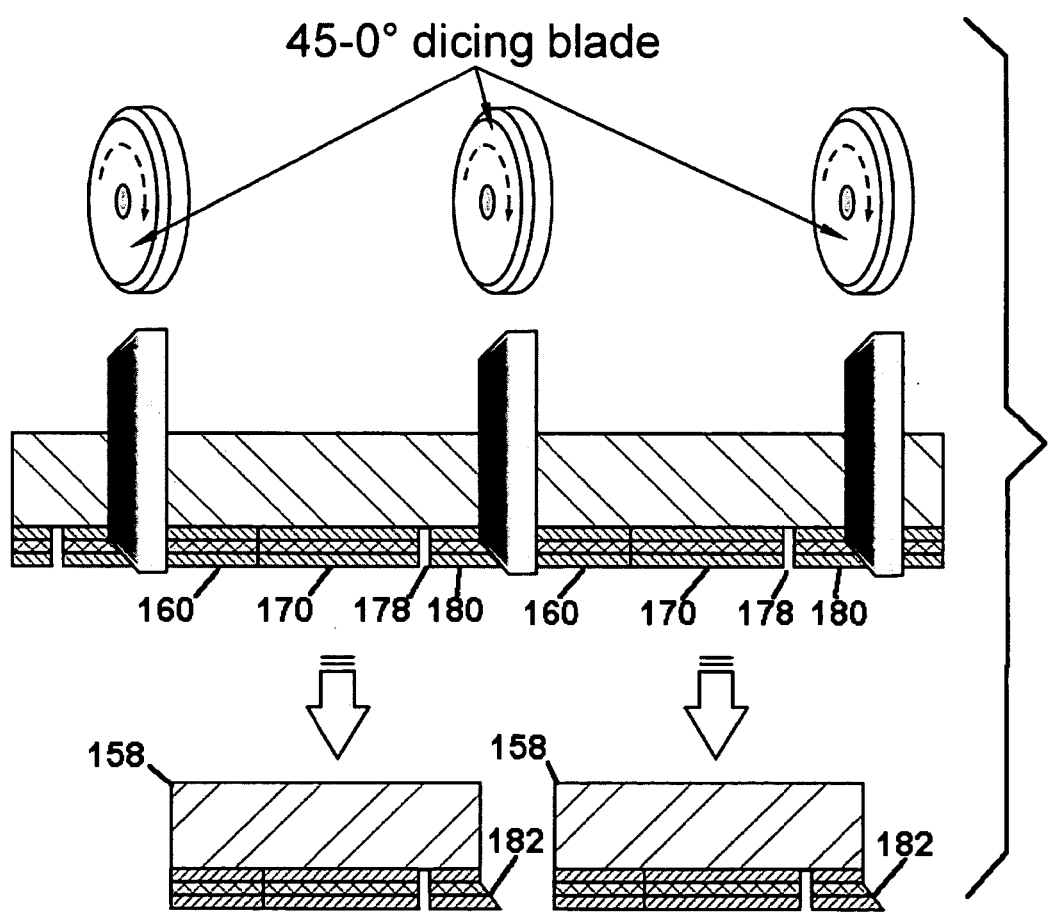
FIG. 7 schematically illustrates an exemplary dicing step that may be used in forming the first exemplary planar microlens module according to the present invention.

Microlens module 158 may be manufactured in a number of ways. In preferred methods, a plurality of microlens module 158 can be fabricated at the same time on a common substrate, such as a silicon wafer. Three polymer layers (cladding-core-cladding) are deposited to form a slab waveguide. Thereafter, waveguides 160, micro lenses 170, and reflectors 180 are defined by removal of material from the slab waveguide. For this, one may use direct patterning in the case where the polymer layers comprise photo-definable (i.e., photo-imageable) material, or it can be done by standard photolithography (with a photo mask) and etching of the polymer materials. Instead of using polymer materials to form the slab waveguide, one may use other materials that are transparent at the operating wavelength, such as glass, silica, silicon (at certain wavelength bands), etc. After defining components 160, 170, and 180, the microlens modules 158 are separated from the common wafer. This step may be done by chemical etching (using front and backside masks), laser ablation, or dicing, the latter of which is the most typical approach. By using the dicing approach, the tilt mirror 182 of reflector 180 may be formed by using a dicing saw having a beveled edge. Referring to FIG. 7, one approach is backside dicing of the wafer with a blade that has 45° and 0° dicing slopes. When the blade cuts through the substrate from the backside it forms a 45° angle for tilt mirror 182, and a flat 0° angle of termination on channel waveguide input side. This fabrication method is most appropriate for case where components 160, 170, and 180 comprise polymer materials. The taper for tilt mirror 182 can also be formed by any other know techniques such as polishing, etching with special masks, laser ablation, etc.

Figure 8:
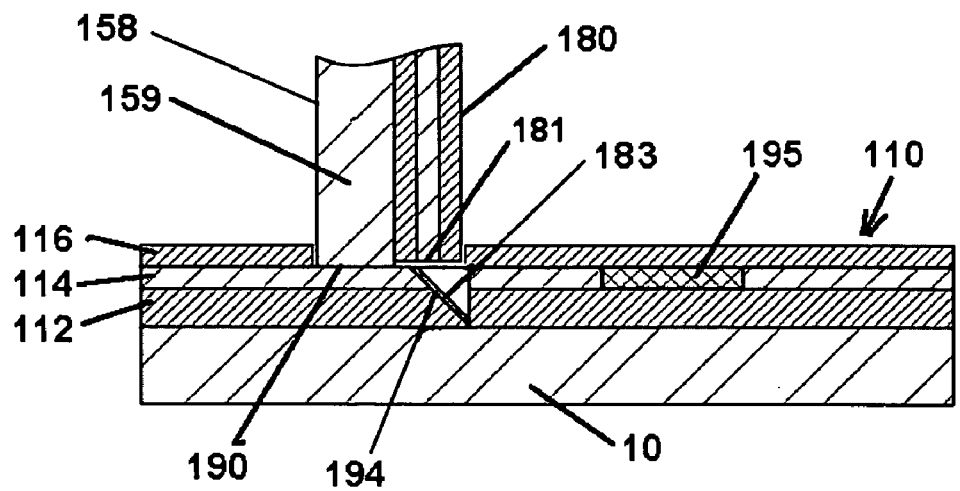
FIG. 8 is a cross-sectional of a second exemplary planar microlens module interfaced with the slab waveguide according to the present invention.

Instead of incorporating tilt mirror 182 on reflector 180, one may use a flat surface at the distal end of reflector 180, and incorporate a tilt mirror within main slab waveguide 110. This is shown in the cross-sectional view of FIG. 8, which is the same cross-section as shown in FIG. 5. Here, a tilt mirror 183 is formed in recess 194 of slab waveguide 110. Recess 194 may be formed with a beveled surface for this purpose. The beveled surface of recess 194 can be formed by a number of techniques known in the industry. For example, one may use tapered blade dicing from the top, or laser ablation, or gray-scale masking followed by etching, etc. A layer of metal may then be formed on the beveled surface to complete the formation of tilt mirror 183. The angle and position of tilt mirror 183 are constructed so as to direct light from reflector 180, which has a flat surface 181 in this embodiment, into core layer 114 of slab waveguide 110.

Figure 9:
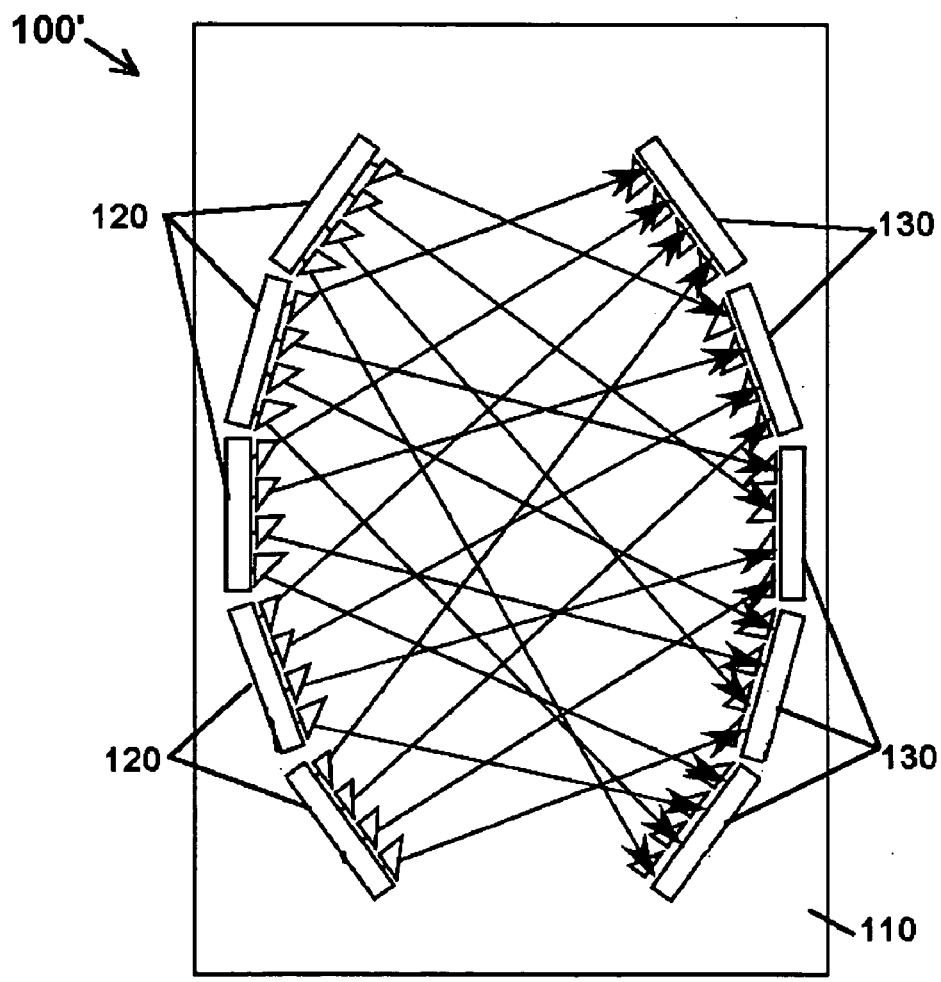
FIG. 9 shows a second exemplary configuration of transmission ports and reception ports to the present invention.
Figure 10:
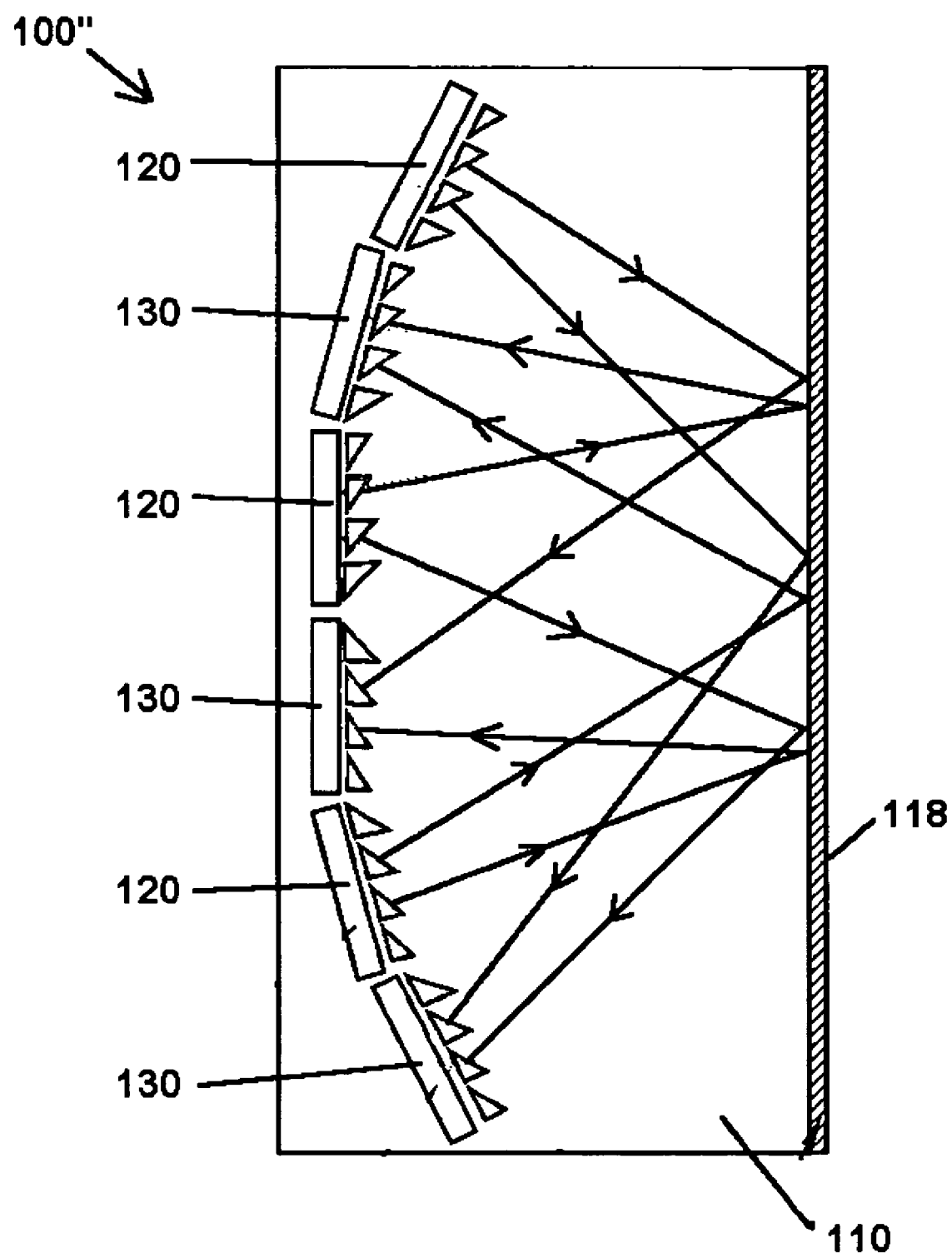
FIG. 10. shows a third exemplary configuration of transmission ports and reception ports to the present invention.

Referring back to FIG. 1, the transmission ports 120 were shown as being disposed along a first straight line, and the reception ports 130 were likewise shown disposed along a second straight line. However, many different layouts of the ports may be used. FIG. 9 is a top plan view of a second exemplary apparatus 100' according to the present invention where the transmission ports 120 are disposed along a first arc of a circle or oval, and the reception ports 130 are disposed along a second arc of a circle or oval, with the first and second arcs facing one another. This configuration generally reduces the amount of deflection that needs to be provided by deflectors 195. FIG. 10 is a top plan view of a third exemplary apparatus 100' according to the present invention where the transmission ports 120 and reception ports 130 are disposed on the same side of slab waveguide 110, opposite to a mirror structure 118 formed in slab waveguide 110. Transmission ports 120 direct their optical signals toward mirror structure 118, which reflects them to corresponding reception ports 130. The reflecting properties of the mirror structure are well known to the art, and conventional ray-tracing techniques may be used to compute the angle of emission of an optical signal from a transmission port 120 required to convey the optical signal to the reception port 130 of the destination daughter board.

The inventors have found that the light propagation losses in slab waveguide 110 are lower than those found in typical channel waveguides. The inventors believe the reason for this to be the fact that the side walls of channel waveguides have surface roughness that contributes to optical losses (such as by scattering), and that slab waveguide 110 does not have these surfaces. While slab waveguide 110 has been illustrated above as being formed on a rigid substrate, it may be appreciated that slab waveguide 110 may be formed on a flexible substrate or on a substrate that is removed after fabrication. The flexible implementation of slab waveguide 110 enables the waveguide to be wrapped around a cylindrical surface or the like, or to be wrapped around back onto itself, thereby allowing the transmission and reception ports for a particular electronic component to be located near one another.

While the apparatus has been illustrated with the transmitted optical signals being handled by respective transmission ports and the received optical signals being handled by respective reception ports, it may be appreciated that the transmitted and received optical signals for an electronic component may be grouped together in a single fiber array and handled by a single implementation of port 150 (or port 250 illustrated below). It may also be appreciated that micro lens 170 may be directly integrated onto slab waveguide 110, and that waveguide 160 may directly couple light to reflector 180. The latter possibility is related to the next presented embodiment of the optical apparatus according to the present invention.

Figure 11:
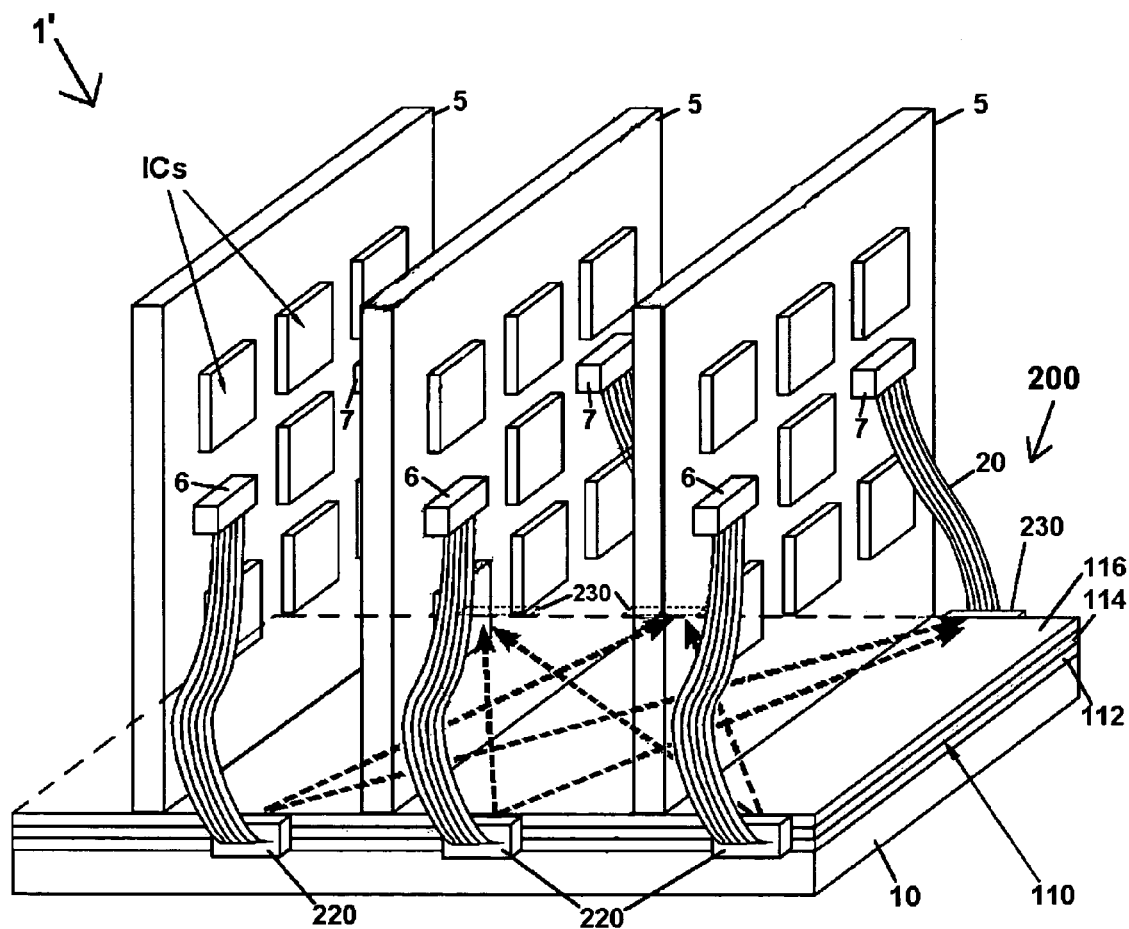
FIG. 11 shows a second embodiment of the optical apparatus, as used in a computer system, according to the present invention.

FIG. 11 shows a second embodiment 200 of the optical apparatus according to the present invention, where the optical apparatus is used to provide optical interconnections among a plurality of N electronic components. The N electronic components may be the daughter boards 5 discussed above, or other components, as discussed in greater detail below. In FIG. 11, we illustrate optical apparatus 200 for the application of providing optical interconnections a plurality of daughter boards 5 in a computer system 1'. Apparatus 200 comprises a slab waveguide 110, a plurality of N transmission ports 220 optically coupled to slab waveguide 110, and a plurality of N reception ports 230 optically coupled to slab waveguide 110. Slab waveguide 110 may be formed on a substrate 10, as described above, and that substrate may be a flexible one, or a removable one. As described above, slab waveguide 110 comprises a lower cladding layer 112, a core layer 114, and preferably an upper cladding layer 116 (although apparatus 200 may be constructed so that air acts to replace upper cladding layer 116). Layers 112–116 preferably comprise polymer materials, which may be formed over substrate 10 by screen printing, spray coating, and/or spin coating, depending on the board dimensions. The core layer has a refractive index that is 0.5%–3% greater than the refractive index of the cladding layer(s), and preferably 1%–2% larger, and the core and cladding layers are highly transparent to the wavelength of the optical signals coupled to slab waveguide 110. The thickness of each of layers 112–116 may typically range between 5 μm to 100 μm, and preferably ranges between 10 μm to 50 μm. As one typical example, each of layers 112–116 may have a thickness of 50 μm. Optical signals within slab waveguide 110 are permitted to cross one another. Substrate 10 may comprise any conventional board material used in the industry, such as FR4 board.

Daughter boards 5 are the same as described above. They transmit light beams (optical signals) to respective transmission ports 220 by way of respective fiber arrays 20, and receive light beams from respective reception ports 230 by way of respective fiber arrays 20. Light beams are coupled from transmission ports 220 to reception ports 230 through slab waveguide 110, as described above. To simplify the visual presentation of apparatus 200 in FIG. 11, ports 220 and 230 have been schematically shown in the figure, with detailed views of their constructions discussed below with the aid of further figures. Nonetheless, FIG. 11 illustrates a key point of ports 220 and 230, which is that they couple light beams to core layer 114 at the edges of slab waveguide 110, rather than at the top surface. This feature eliminates the need for reflector 180 and tilt mirrors 182 (discussed above), and thereby reduces optical losses.

Figure 12:
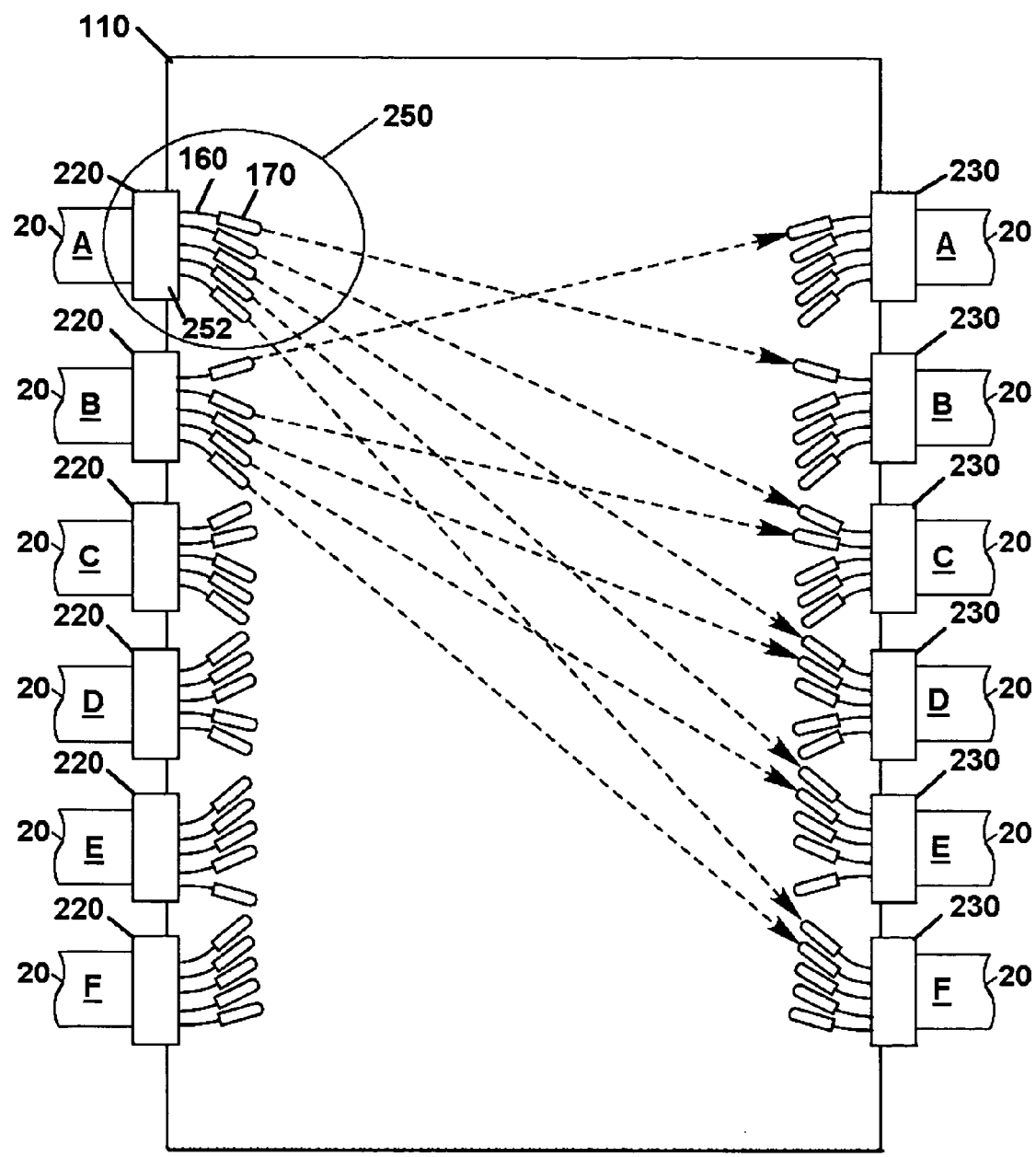
FIG. 12 shows a top-plan schematic view of the second embodiment of the optical apparatus according to the present invention.

As a second feature of apparatus 220, the waveguides 160 and micro lenses 170 of a port are integrated into slab waveguide 110. This is illustrated in FIG. 12, which shows a schematic top plan view of slab waveguide 110 with ports 220 and 230 coupled thereto. To provide a more expansive illustration of the embodiment, six transmission ports 220 and six reception ports 230 are shown in FIG. 12 (rather than three). The six pairs of transmission and reception ports are associated with six electronic components, which are denoted in FIG. 12 by letters A, B, C, D, E, and F written on the fiber arrays 20 leading to those components. Each transmission port for an electronic component transmits light beams to the reception ports of the other electronic components, and preferably not to the reception port associated with its electronic component. For example, the transmission port 220 for electronic component A transmits light beams to the reception ports 230 associated with electronic components B, C, D, E, and F; and the transmission port 220 for electronic component B transmits light beams to the reception ports 230 associated with electronic components A, C, D, E, and F; etc. The transmission optical paths for these light beams are illustrated in FIG. 12 by dashed lines. To simplify the visual presentation of the figure, the light beams emanating from the transmission ports for components C, D, E, and F to the reception ports 230 have not been illustrated by dashed lines. (However, it may be seen in the figure that the micro lenses 170 of these ports are aligned to convey the light beams to the appropriate reception ports.)

Each of ports 220 and 230 may have the same basic construction (with minor variations), as illustrated by an exemplary port 250. Port 250 comprises an adapter 252 that receives the fiber ends of a fiber array 20 and couples the associated fiber cores to an edge of slab waveguide 110 in alignment align with level of core layer 114, a plurality of waveguides 160, and a plurality of micro lenses 170. Each waveguide 160 has a first end that is positioned to face a corresponding fiber core of a fiber array 20, and a second end coupled to one side of respective micro lens 170. When port 250 is functioning as a transmission port 220, the respective micro lens 170 spreads the beam width of the light beam, and couples a substantially-collimated or cross-collimated light beam onto slab waveguide 110, along a respective optical path to a reception port 230 of a destination daughter board. Both waveguide 160 and micro lens 170 preferably have layer 112 as their lower cladding layers, layer 114 as their core layers, and layer 116 as their upper cladding layers. In addition, waveguide 160 is curved along its length by an amount that enables its respective micro lens 170 to face a reception port of the destination daughter board. When port 250 is functioning as a reception port 230, the respective micro lens 170 couples a light beam from slab waveguide 110, as directed to it by a transmission port 220, and converges the light into waveguide 160. Each waveguide 160 is preferably coupled to a receiving micro lens 170, and is curved along its length by an amount that enables its respective micro lens 170 to face the transmission port 220 providing the light beam.

The curving of the waveguides 160 in the above manner enables one to eliminate deflectors 195 (shown in FIGS. 2, 5, 6 and 8). In addition, current manufacturing processes enable the precise placement and construction of waveguides 160 and micro lenses 170, which eliminates the step of aligning microlens array 158 (shown in FIGS. 2–5) to slab waveguide 110 for port 150 (shown in FIG. 2).

Figure 13:
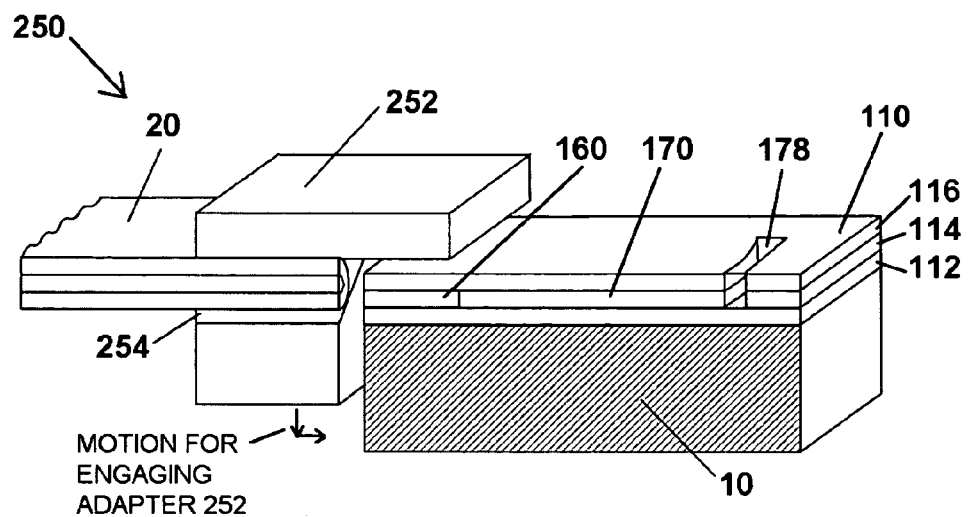
FIG. 13 shown a cut-away perspective view of a second embodiment of a port according to the present invention, that may be used for each of the transmission ports and reception ports according to the present invention.

FIG. 13 shows a cut-away perspective view of port 250, showing waveguide 160, micro lens 170, and gap 178 disposed between micro lens 170 and slab waveguide 110. For clarity in the figure, adapter 252 is shown in a disengaged position that is above and to the left of the left edge of waveguide 160 and slab waveguide 110. When adapter 252 is engaged to waveguide 110, each fiber core of array 20 abuts and aligns to the core layer of a corresponding waveguide 160. In preferred embodiments, an MT mount is not used on the end of fiber array 20 that connects to adapter 252. Instead, the individual fibers of fiber array 20 are held within respective V-grooves on an inner surface of adapter 252, and may be adhered thereto by an adhesive. Adapter 252 may comprise a bottom substrate, in which the V-grooves are formed, and a top substrate that is disposed over both of the bottom substrate and the fibers so as to lock the fibers in place. The top and bottom substrates of adapter 252 may be held together in a fixed position by adhesive and/or fasteners. Adapter 252 may be releasably fixed to slab substrate 110 by any manner available in the art. As one way, the top substrate of adapter 252 may be screwed or bolted to substrate 10, with screws/bolts disposed at the distal side ends of the top substrate. As part of the manufacturing process of slab waveguide 110, precision alignment marks may be made on top of slab waveguide 110 for aligning adapter 252 to it.

Figure 14:
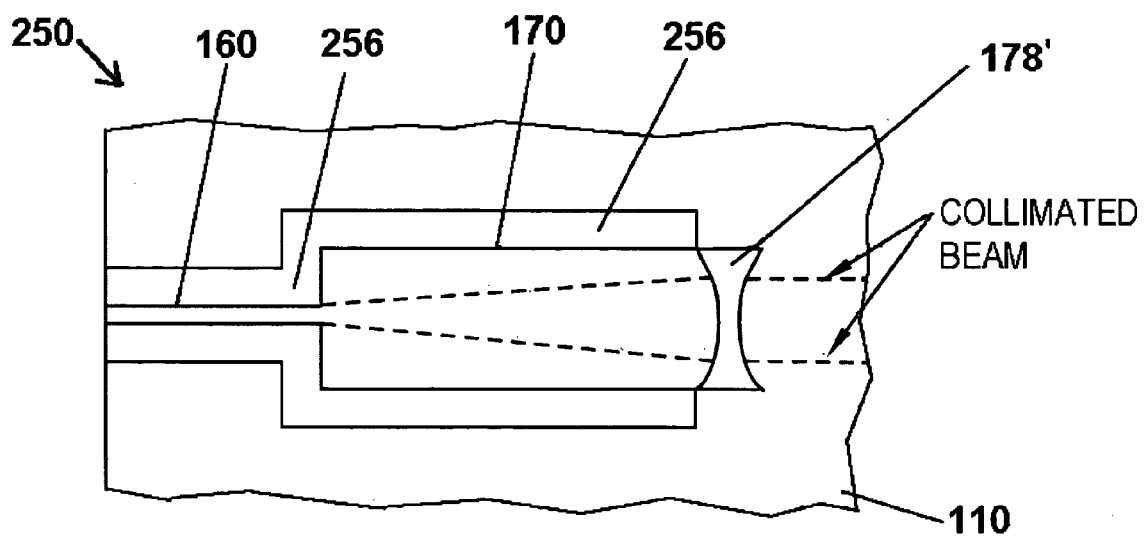
FIG. 14 shows a top-plan view of the waveguide and micro lens components of the second exemplary embodiment of a port according to the present invention.

FIG. 14 shows a top plan view of waveguide 160, micro lens 170 of port 250, as formed in slab waveguide 110, with a second example of a lens gap, identified as lens gap 178'. The dashed lines in the figure show the beam width of the light as it is conveyed from waveguide 160 to slab waveguide 110, or vice versa, through micro lens 170. A definition gap 256 is used to separate and define waveguide 160 from slab waveguide 110, and to define the attachment point of waveguide 160 to micro lens 170. Gap 256 reaches through core layer 114, and down to at least the top of lower cladding layer 112. Definition gap 256 may be left open (e.g., filled with air), or it may be filled with a material that has a lower refractive index than core layer 114. For example, the material of upper cladding layer 116 may be used to fill definition gap 256. Definition gap 256 may be extended from the sides of waveguide 160 to lens gap 178 so as to cover the sides of micro lens 170. The extension is usually not necessary since the spreading of the beam within micro lens 170 does not need to be confined by the sides of micro lens 170. However, it may be done as a precautionary measure to prevent stray light (i.e., light from other transmission ports) from entering the sides of the lens and being inadvertently received by waveguide 160 or transmitted by micro lens 170. In a similar manner, lens gap 178' separates and defines the lens face of micro lens 170 from slab waveguide 110. Lens gap 178' reaches through core layer 114, and down to at least the top of lower cladding layer 112. Lens gap 178' may be left open (e.g., filled with air), or it may be filled with a material that has a lower refractive index than core layer 114, or may be filled with a material that has a higher refractive index (which would require a difference surface shape than that shown in the figure). The material may be filled while in liquid form, and then later cured with heat and/or ultra-violet light.

The previously-described lens gap 178 had one curved surface, whereas lens gap 178' has two curved surfaces (opposing one another). In general, one or both surfaces of the lens gap may be curved. For example, while the left and right surfaces of lens gap 178' are curved, an embodiment may be constructed where the left surface is straight and only the right surface is curved. Thus, as can be seen, the lens gap is part of micro lens 170.

Figure 15:
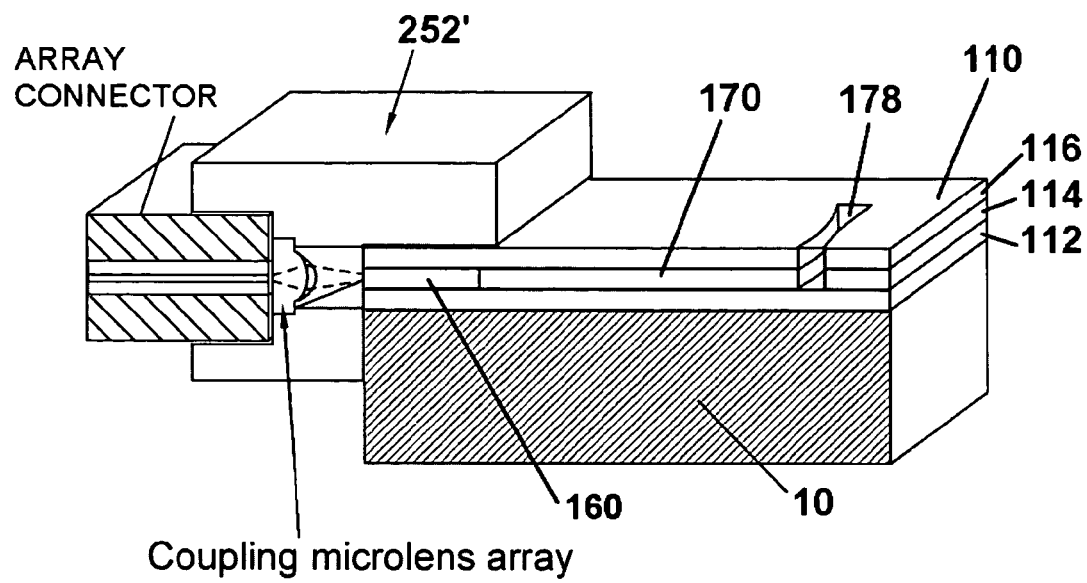
FIG. 15 shows an implementation of the second embodiment of a port according to the present invention using a second embodiment of the port's adapter according to the present invention.

In port 250 shown in FIG. 13, the fiber cores of fiber array 20 were directly held by adapter 252. It may be appreciated that the adapter may be constructed to accept conventional fiber array connectors (e.g., MT connectors). FIG. 15 schematically illustrates an embodiment of an adapter 252' that connects to a conventional connector of a fiber array. Adapter 252' may be permanently attached to slab waveguide 110, and optionally to substrate 10. Also, adapter 252' may have a coupling aperture that releasably connects with the connector end of fiber array 20 so that fiber array 20 may be detached from adapter 252'. To facilitate the alignment of the optical light beam between a core of the fiber array and the opposing core of waveguide 160, any coupling lens or coupling lens array available and/or known in the art may be disposed between the fiber core and waveguide 160, as illustrated in FIG. 15. Such coupling lenses typically introduce an optical loss of in the range of 0.5 dB to 2 dB. The fiber-array connector can be either actively or passively aligned to slab waveguide 110. For passive alignment, alignment features (e.g., alignment marks) known in the industry can to be formed on the connector and the slab waveguide.

Figure 16:
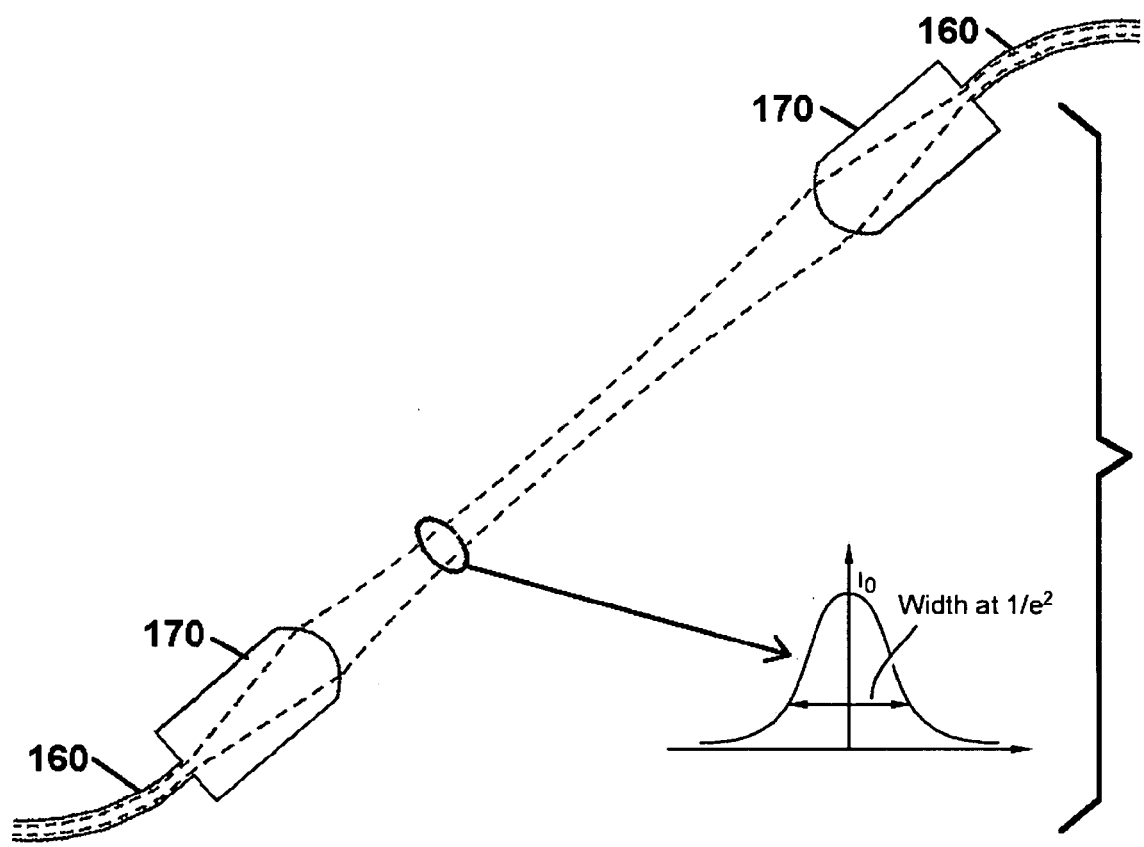
FIG. 16 is shows a top-plan schematic view of a cross-collimated beam propagating between two ports according to the present invention.

FIG. 16 shows the beam-width profile of an exemplary light beam as it propagates from the micro lens 170 of a transmission port to a micro lens 170 of a reception port. The beam width is substantially Gaussian in shape. Also shown in the figure is the feature of the beam being cross-collimated so that the beam width becomes more narrow at the midpoint between micro lenses 170 than it is at the micro lenses. The distance between the input and output lenses may typically range from 10 mm to 1000 mm. To travel these distances, the input micro lens should collimate or cross-collimate the light beam laterally so that it can more effectively propagate over these distances.

As is known in the art, the divergence in the width of a light beam becomes greater as the width of the light beam becomes narrower. Because micro lenses 170 are relatively small, there is a tendency for the width of the light beam to diverge as it exits the lens and enters the slab waveguide. This could be addressed by making the micro lenses 170 wider, but that would take up more space and reduce the total number of optical signals that could be conveyed through slab waveguide 110. Thus, there would appear to be the following dilemma in the construction of apparatus 200: slab waveguide 110 could be made larger in order to accommodate more micro lenses 170 for more optical signals, but the larger size would increase the distances traveled by the light beams, which in turn would require wider micro lenses 170, which in turn would reduce the number of micro lenses that could be used. The inventors have found a solution to this apparent dilemma, and that is to design micro lenses 170 so that their output beams are cross-collimated, as shown in FIG. 16. The cross-collimation enables the light beam to travel farther while being transmitted from a smaller-width micro lens 170. It is well within the ordinary skill of the art to construct the geometry of micro lens 170 to produce collimated light beams. From this, a cross-collimated beam may be achieved by slightly increasing the curvature of one or both of the lens surfaces of lens gap 178 or 178'. Drawing from these teachings of the present application, and using commercially available optics design software, it would be within the ability of one of ordinary skill in the art to construct micro lens 170 to achieve the cross-collimation shown in FIG. 16.

As examples, the inventors have been able to construct implementations of apparatus 200 that can propagate light through slab waveguide 110 at distances of up to 100 mm with beam widths of less than 400 µm, as measured at the $1/e^2$ intensity point ($1/e^2 \approx 0.13$). For propagation over distances of 500 mm to 1000 mm, the inventors have found that the beam width should preferably be increased to 1 mm or more. The micro lenses 170 of the ports may have different lateral dimensions and design parameters depending on the distance that their optical signals are to travel. Also, micro lenses 170 may have the same dimensions, in which case the lenses can all have the same lateral dimensions in order to accommodate the light beam that has the greatest distance to travel.

Figure 17:
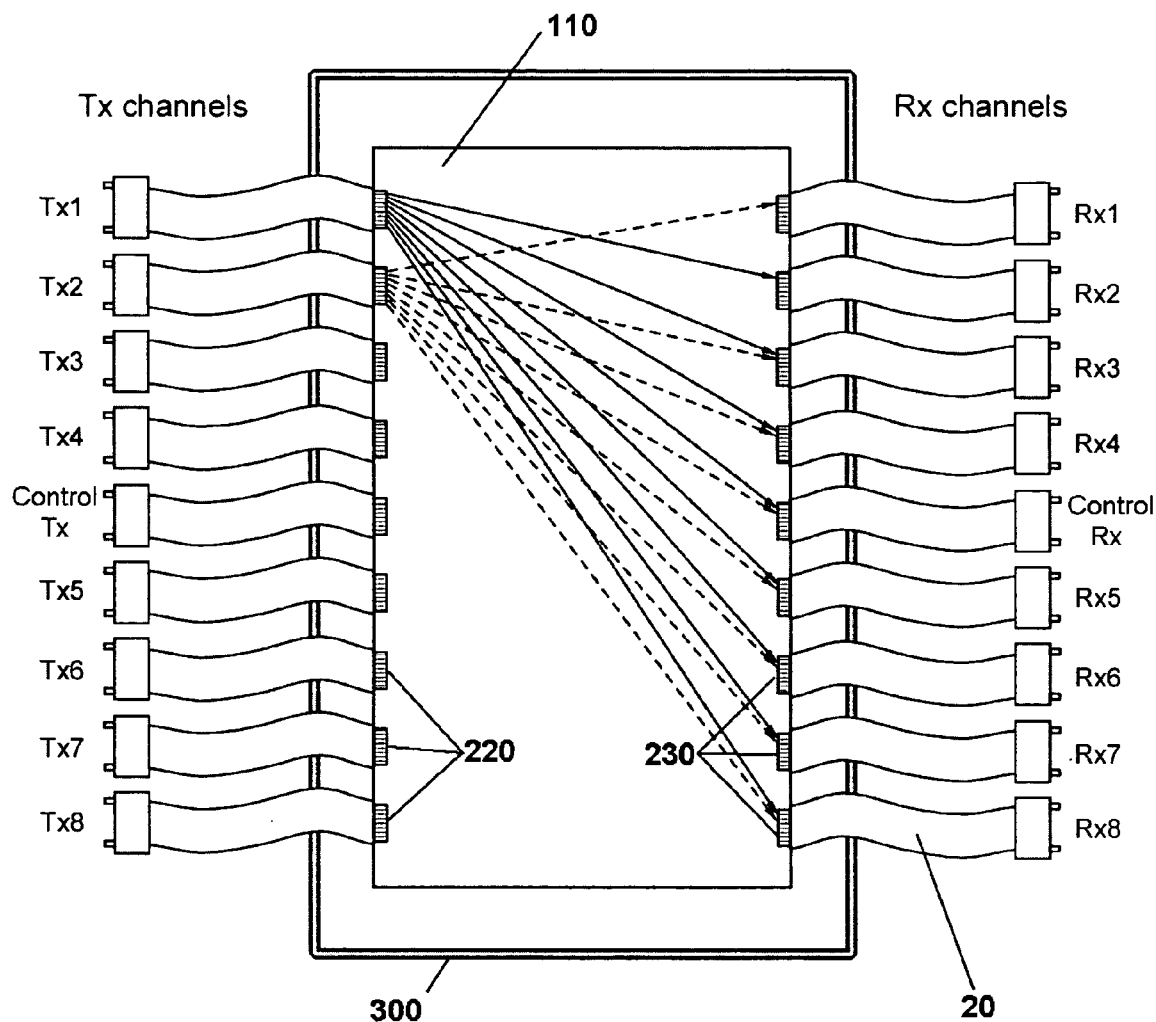
FIG. 17 shows a top-plan schematic view of a third embodiment of the optical apparatus according to the present invention.

FIG. 17 shows an optical apparatus 300 that is constructed in a similar manner to apparatus 200, except that there are nine transmission ports 220 and nine reception ports 230, and that the fiber arrays 20 may be permanently attached (i.e., not normally releasable) to slab waveguide 110 and/or a substrate upon which slab waveguide 110 is disposed. Each pair of oppositely disposed transmission port 220 and reception port 230 are associated with an electronic component; each transmission port 220 transmits optical signals from its optical component to the reception ports of the other electronic components (and preferably not to the reception port associated with its electronic component). Apparatus 300 may serve as an optical hub with eight (8) input transmission (Tx1–Tx8) channels and eight (8) output reception (Rx1–Rx8) to serve eight electronic components, with a control transmission channel and a control reception channel optically coupled to all eight electronic components. A hub controller may be coupled to the control transmission and control reception channels. The fiber arrays 20 may comprise 8–12 fold fiber ribbons with MT/MTP connectors. Slab waveguide 110, transmission ports 220, reception port 230, and optionally the ends of fiber arrays 20 may be encased within a package in order to make apparatus 300 more rugged.

Before showing some exemplary applications of the present invention, some features of preferred embodiments of apparatuses 100, 200, and 300 are discussed. As seen in FIGS. 1, 9, 10, 11, 12, and 17, a large number of optical paths are established within the slab waveguide 110 by the transmission ports. A high number of these optical paths are not parallel to one another, and the paths are either divergent or convergent, and in many cases cross one another. In fact, there is usually at least one optical path that crosses two or more other optical paths, and usually at least one optical path that crosses three or more other optical paths. Generally, if there are N transmission ports and N reception ports, each optical will usually cross at least (N−1) other optical paths, and a few of the optical paths can cross at least (N−1)+(N−2)$^2$ other optical paths. As another feature, preferred embodiments of the invention do not have any electrically-active opto-electric devices formed in the main part of the slab waveguide 110, so that each optical beam can travel from a transmitting micro lens 170 to a receiving micro lens 170 without passing through an electrically-activated opto-electric device, (or can travel from one deflector 195 to another deflector 195 without passing through an electrically-activated opto-electric device, as in the case of apparatus 100). As another feature, the distances that light beams travel from micro lens 170 to micro lens 170 (or from deflector 195 to deflector 195) are not all the same, and many will be different. Thus, the lens constructions will typically be different in order to provide the best beam propagation characteristics for each distance, particularly when constructing the micro lens to transmit and receive cross-collimated beams. The different lens constructions usually differ in the amount of curvature in the lens surfaces, and have different focusing points.

Figure 18:
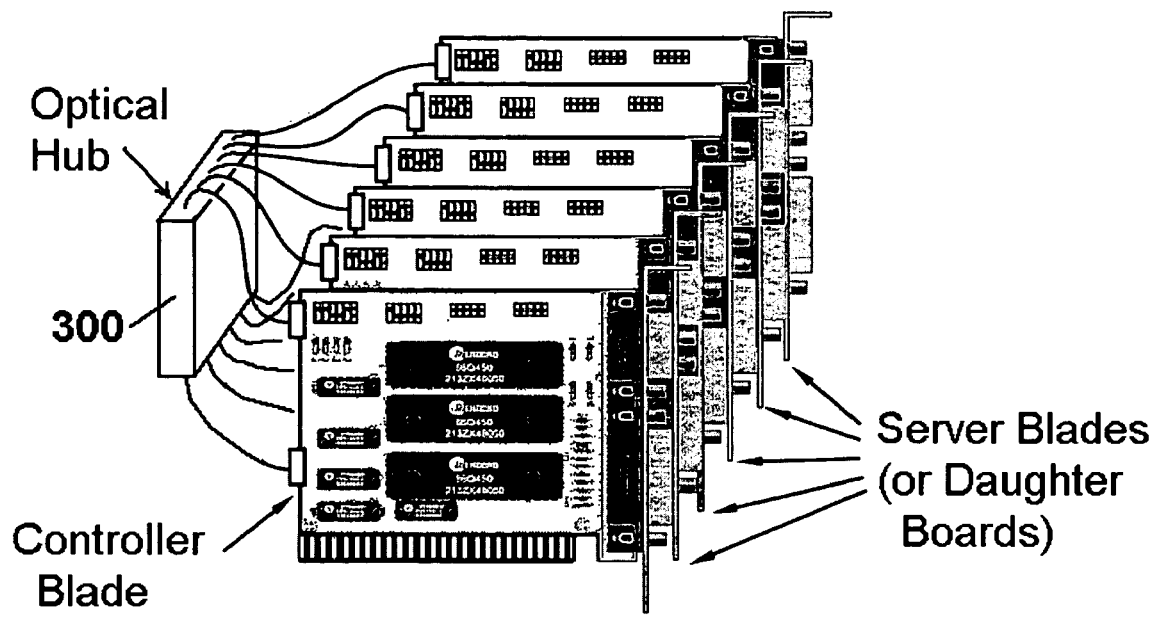
FIG. 18 shows a second exemplary application of the apparatuses according to the present invention.

FIG. 18 shows an exemplary application in which each of apparatuses 100, 200, and 300 may be used. For visual simplicity, apparatus 300 is shown. The application is for an internet server system that has a plurality of server blades. Typically, the internet server system receives requests from the internet to provide web pages and other information, and fetches the information from several disc drives and/or file servers. The server blades may be configured to perform various functions, such as interfacing with the internet or fetching files, or to perform all functions. For the system to work, the server blades need to communication with one another, and need a central controller. A controller server (shown at front) acts to provide the central controller and to coordinate the communications among the server blades and to control the communication packet traffic among the boards. Apparatus 300 enables each server blade to optically interconnect with all of the other server blades, and enable the controller server to optically communication with all of the server blades. The same topology show in FIG. 18 may be used for a super computer, in which case daughter boards replace the server blades.

Figure 19:
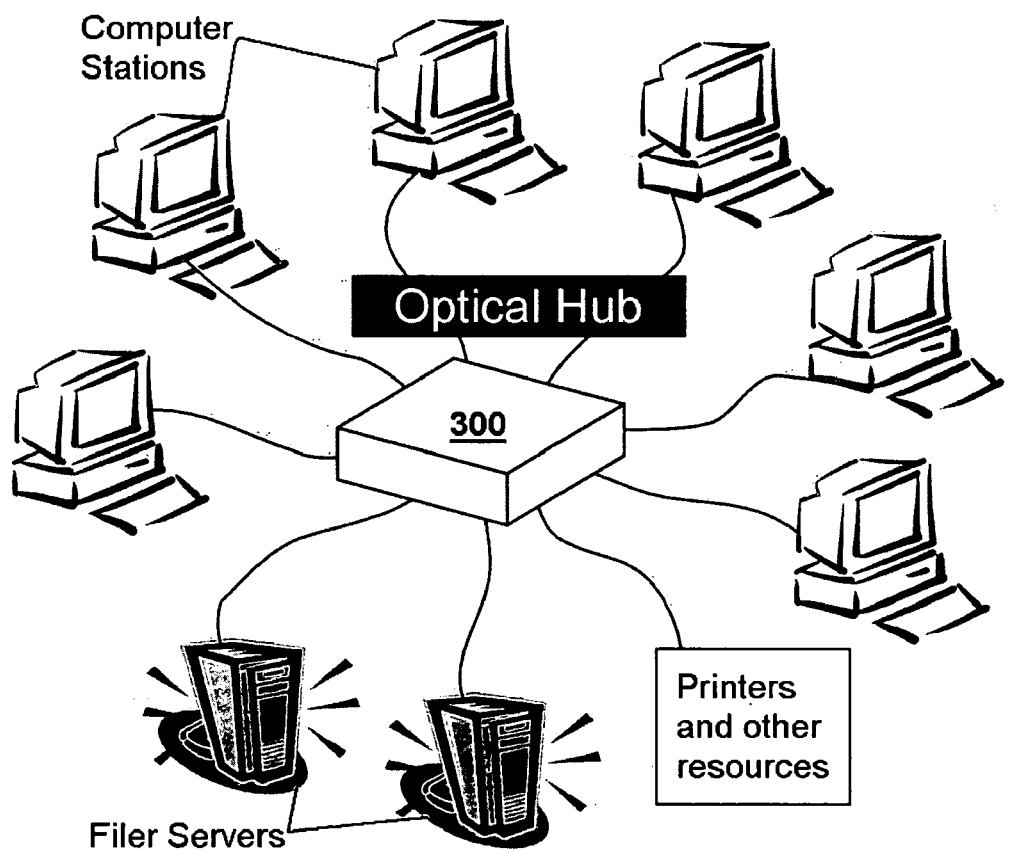
FIG. 19 shows a third exemplary application of the apparatuses according to the present invention.

FIG. 19 shows an exemplary application in which each of apparatuses 100, 200, and 300 may be used. For visual simplicity, apparatus 300 is shown. The application is for an optical local-area network (LAN), where a plurality of computer stations, file servers, printers and other resources are interconnected together. Each of the computer stations, filer servers, printers, and other resources are coupled to a respective pair of TX and RX ports 220 and 230 of apparatus 300 through long fiber arrays. Through apparatus 300, each of computer stations is optically coupled to the other computer stations, as well as the file servers, printers, and other LAN resources. One of the filer servers may act as the central controller (instead of file serving, or in addition thereto), and may be coupled to the controller TX and RX ports of apparatus 300. This file server may act to control optical communications through apparatus 300. However, apparatus 300 has the flexibility to enable the computer stations and file servers to independently control their optical communications, and to establish point-to-point communications on their own.

Figure 20:
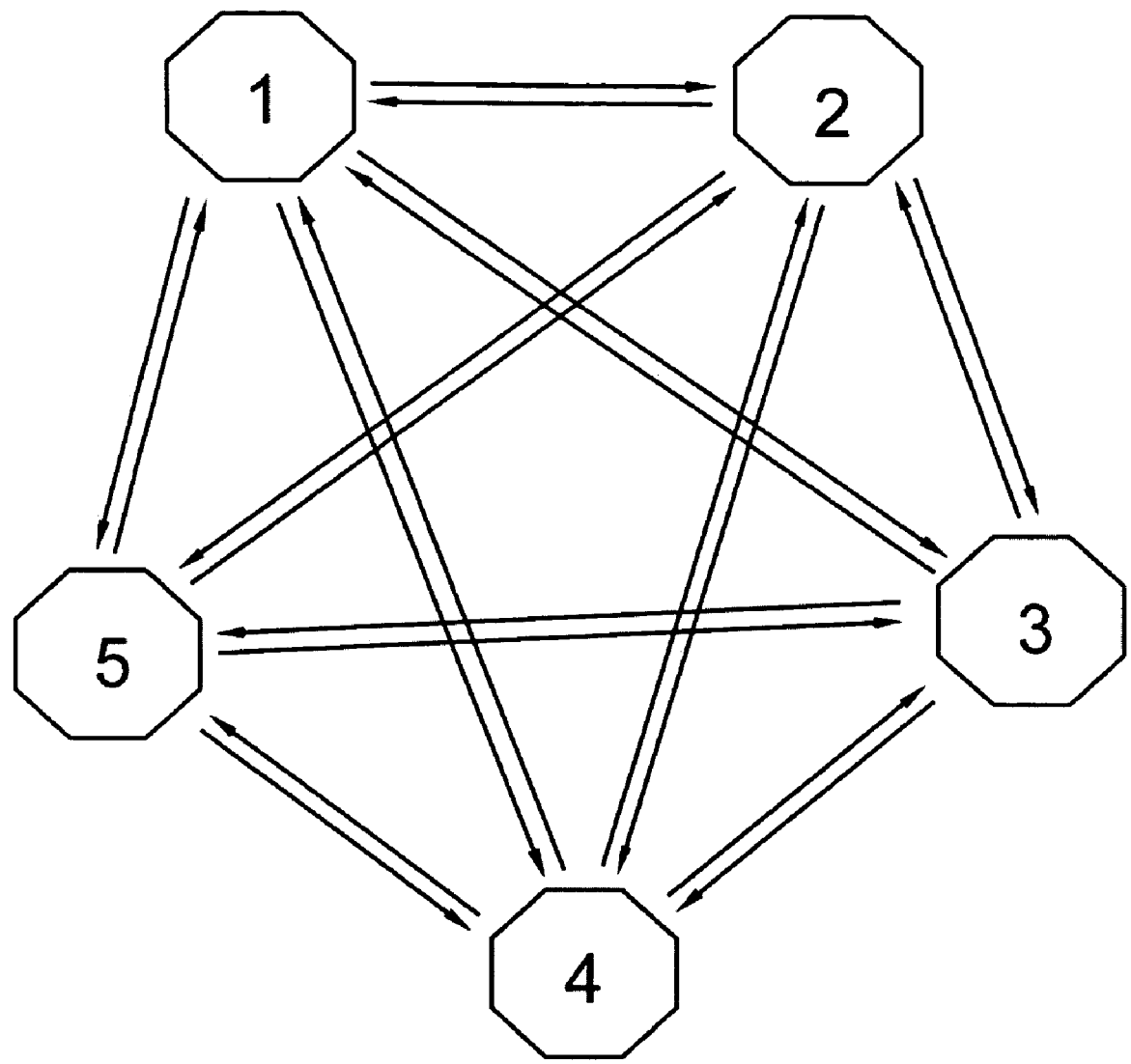
FIG. 20 illustrates the point-to-point communications between electronic components according to the present invention.

Each of apparatuses 100, 200, and 300 enable a plurality of electronic components to establish high-speed, point-to-point optical communications among one another. This is illustrate in FIG. 20, which shows the possible optical interconnections between five electronic components. Each of these components may be daughter boards of a computer system, or the LAN components discussed above. While the LAN depicted in FIG. 19 show a star wiring configuration with respect to apparatus 300, the apparatus effects the point-to-point communications exemplified in FIG. 20 among the LAN components. At present, the apparatuses according to the present invention can enable point-to-point transmit and receive rates of up to 10 Gigabits per second between each pair of electronic components.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An optical apparatus for providing optical interconnections among a plurality N of electronic components, N being at least three, the optical apparatus comprising:

a slab waveguide having a top surface, and a core layer that enables light beams to propagate in a plurality of directions within the core layer, and that enables light beams to cross one another without substantial interference to one another;

a plurality of N reception ports, each reception port being assigned to serve a respective electronic component; and a plurality of N transmission ports, each transmission port being associated with a respective reception port and assigned to serve the same electronic component as its associated reception port, each transmission port being configured to receive a plurality of light beams from its assigned electronic component and to transmit each received light beam onto the slab waveguide along an optical path to a reception port, the transmission ports providing a plurality of such optical paths in the slab waveguide; and wherein each reception port is constructed to receive from the slab waveguide a plurality of optical signals transmitted from at least two different transmission ports; and wherein at least two optical paths cross one another.

2. The apparatus of claim 1 wherein the transmission ports are disposed on a first side of the slab waveguide along a first line, and wherein the reception ports are disposed on a second side of the slab waveguide along a second line.

3. The apparatus of claim 1 wherein the transmission ports are disposed on a first side of the slab waveguide along a first arc of a circle or oval, and wherein the reception ports are disposed on a second side of the slab waveguide along a second arc of a circle or oval.

4. The apparatus of claim 1 wherein the slab waveguide further comprises a mirror structure disposed along a first side of the slab waveguide, and wherein transmission ports and reception ports are disposed along a second side of the slab waveguide.

5. The apparatus of claim 1 wherein at least one of the ports comprises:
a planar micro lens with a first optical surface and second optical surface; and
a light deflector disposed in the slab waveguide and constructed to couple light between itself and the slab waveguide, wherein the planar micro lens and the light deflector are disposed to enable light to be coupled between the second optical surface of the planar micro lens and the light deflector.

6. The apparatus of claim 5 wherein the at least one port further comprises an optical waveguide having a first end, a second end disposed to face the first optical surface of the micro lens, a length between the first and second ends along which light can propagate, and a width perpendicular to the length, wherein the width is less than the length.

7. The apparatus of claim 5 wherein the micro lens is formed on a substrate, wherein the second optical surface of the micro lens is disposed over a point on the top surface of the slab waveguide, and wherein the at least one port further comprises a reflecting surface disposed at said point on the top surface, the reflecting surface capable of coupling a light beam between the second optical surface of the micro lens and the light deflector.

8. The apparatus of claim 7 wherein the reflecting surface is formed on the same substrate as the micro lens.

9. The apparatus of claim 8 wherein the substrate has at least one edge, wherein the reflecting surface is disposed at the at least one edge, and wherein the slab waveguide comprises a recess that is constructed to receive the at least one edge of the substrate and the reflecting surface.

10. The apparatus of claim 7 wherein the reflecting surface is formed in the slab waveguide.

11. The apparatus of claim 10 wherein the substrate has at least one edge, wherein the micro lens directs its output light beam toward the at least one edge, and wherein the slab waveguide comprises a recess that is constructed to receive the at least one edge of the substrate.

12. The apparatus of claim 5 wherein the light deflector comprises at least one of a grating, a mirror, and a prism deflector.

13. The apparatus of claim 5 wherein the light deflector comprises a prism deflector disposed in at least the core layer of the slab waveguide, the prism deflector comprises a body of material having at least three sides and a refractive index that is different from that of the core layer of the slab waveguide.

14. The apparatus of claim 5 wherein the at least one port is a transmission port,
wherein the planar micro lens receives an input light beam at its first optical surface and outputs a collimated or cross-collimated light beam at its second optical surface, and
wherein the light deflector receives the output light beam from the micro lens along a first optical path and deflects the light beam to the slab waveguide along a second optical path that is different from the first optical path.

15. The apparatus of claim 5 wherein the at least one port is a reception port,
wherein light deflector receives a light beam from the core layer of the slab waveguide, the received light beam traveling along a first optical path, the light deflector outputting a deflected light beam that travels along a second optical path that is different from the first optical axis,
wherein the planar micro lens receives the deflected light beam at its second optical surface, the deflected light beam having a first beam width, and
wherein the planar micro lens is constructed to focus the deflected light beam and to generate an output light beam at its first optical surface, the output light beam having a second beam width that is smaller than the first beam width.

16. The apparatus of claim 1 wherein at least one transmission port comprises a first planar micro lens disposed in said slab waveguide and having a first optical surface and a second optical surface, the first planar micro lens being constructed to receive an input light beam at its first optical surface and to output a collimated or cross-collimated light beam at its second optical surface that propagates along a first optical path, and
wherein a reception port comprises a second planar micro lens disposed in said slab waveguide and having a first optical surface and a second optical surface, the second planar micro lens being positioned to receive at its second optical surface the collimated or cross-collimated light beam output by the first micro lens, the received light beam having a first beam width, the second planar micro lens being constructed to focus the received light beam and to generate an output light beam that has a second width that is smaller than the first width, the output light beam emanating from the first optical surface of the second micro lens.

17. The apparatus of claim 16 wherein the first planar micro lens is constructed to generate a cross-collimated light beam.

18. The apparatus of claim 16 further comprising an optical waveguide having a first end for receiving the input light beam, a second end disposed to face the first optical surface of the first micro lens, and a length between the first and second ends, the optical waveguide having a width that is perpendicular to the direction of light propagation in the optical waveguide, the width being less than the length of the optical waveguide, and wherein at least a portion of the optical waveguide is curved along its length.

19. The apparatus of claim 16 further comprising an optical waveguide having a first end disposed to face the first optical surface of the second micro lens, a second end, and a length between the first and second ends, the optical waveguide having a width that is perpendicular to the direction of light propagation in the optical waveguide, the width being less than the length of the optical waveguide, and wherein at least a portion of the optical waveguide is curved along its length.

20. The apparatus of claim 16 wherein the first micro lens further comprises a lens gap formed in at least the core layer of the slab waveguide, the lens gap having at least one curved surface that defines the second optical surface of the first micro lens.

21. The apparatus of claim 20 wherein the lens gap of the first micro lens has a first curved surface that defines the second optical surface of the first micro lens and a second curved surface that defines an additional optical surface of the first micro lens array.

22. The apparatus of claim 20 wherein the lens gap of the first micro lens is filled with a material having an refractive index that is different from the refractive index of the core layer of the slab waveguide.

23. The apparatus of claim 16 wherein the second micro lens further comprises a lens gap formed in at least the core layer of the slab waveguide, the lens gap having at least one curved surface that defines the second optical surface of the second micro lens.

24. The apparatus of claim 23 wherein the lens gap of the second micro lens has a first curved surface that defines the second optical surface of the second micro lens, and a second curved surface that defines an additional optical surface of the second micro lens array.

25. The apparatus of claim 23 wherein the lens gap of the second micro lens is filled with a material having an refractive index that is different from the refractive index of the core layer of the slab waveguide.

* * * * *